United States Patent
Zamer

(10) Patent No.: US 9,407,709 B2
(45) Date of Patent: Aug. 2, 2016

(54) INFORMATION PROVISION THROUGH TEMPORARY SOCIAL NETWORKS

(71) Applicant: EBAY INC., San Jose, CA (US)

(72) Inventor: Kamal Zamer, Austin, TX (US)

(73) Assignee: PayPal, Inc., San Jose, CA (US)

( * ) Notice: Subject to any disclaimer, the term of this patent is extended or adjusted under 35 U.S.C. 154(b) by 299 days.

(21) Appl. No.: 13/782,715

(22) Filed: Mar. 1, 2013

(65) Prior Publication Data

US 2014/0250174 A1 Sep. 4, 2014

(51) Int. Cl.
| | |
|---|---|
| *G06F 15/16* | (2006.01) |
| *H04L 29/08* | (2006.01) |
| *G06Q 30/02* | (2012.01) |
| *H04W 4/02* | (2009.01) |
| *H04W 4/08* | (2009.01) |
| *G06Q 50/00* | (2012.01) |
| *G06Q 20/00* | (2012.01) |

(52) U.S. Cl.
CPC .............. *H04L 67/22* (2013.01); *G06Q 30/02* (2013.01); *G06Q 50/01* (2013.01); *H04L 67/306* (2013.01); *H04W 4/023* (2013.01); *H04W 4/028* (2013.01); *H04W 4/08* (2013.01); *G06Q 20/00* (2013.01)

(58) Field of Classification Search
CPC ...................................................... H04L 65/403
USPC .......................................... 709/201, 204, 206
See application file for complete search history.

(56) References Cited

U.S. PATENT DOCUMENTS

| | | | |
|---|---|---|---|
| 8,548,503 B2* | 10/2013 | Oh ....................... | H04L 12/1818 455/414.2 |
| 2013/0204937 A1* | 8/2013 | Fernando et al. ............. | 709/204 |
| 2014/0040374 A1* | 2/2014 | Olsen et al. ................... | 709/204 |
| 2014/0188992 A1* | 7/2014 | Jayawardane ................ | 709/204 |
| 2014/0229618 A1* | 8/2014 | Kumar ................ | H04L 67/1044 709/225 |

* cited by examiner

*Primary Examiner* — Ario Etienne
*Assistant Examiner* — Sahera Halim
(74) *Attorney, Agent, or Firm* — Haynes and Boone, LLP

(57) ABSTRACT

A method for providing location-based information via a temporary social network includes detecting each of a plurality of first user devices within a predetermined proximity of a physical location and, in response, connecting each of the plurality of first user devices to a social network that is associated with the physical location using a communications network. In some embodiments, each of the plurality of first user devices will be connected to the social network for a predetermined amount of time or for as long as they are in the predetermined proximity. While in the social network, location-based information about the physical location is received over the communications network from each of the plurality of first user devices connected to the social network. At least some of that location-based information about the physical location may then be over the communications network to a second user device.

20 Claims, 13 Drawing Sheets

INFORMATION PROVISION THROUGH TEMPORARY SOCIAL NETWORKS

BACKGROUND

1. Field of the Invention

The present invention generally relates to social networking and more particularly to the provision of information through temporary social networks.

2. Related Art

Social networks may be provided by social network systems that provide an online service, platform, or site that operates through a plurality of computers connected over a network such as, for example, the Internet. These social network systems facilitate the building of social networks or social relations among people who share interests, activities, backgrounds, real-life connections, and/or a variety of other characteristics known in the art. Such social network systems typically consist of a representation of each user (often via a user profile), the user's social links, and any of a variety of services.

One of the many services provided by social network systems is to obtain information about businesses from users of the social network and provide that information to other users in the social network. For example, a user may interact with a business and then rate the business and/or write a review about that business such that the rating and/or review are stored on the social network system. Other users may then retrieve the rating (or an aggregate rating of the business by a plurality of users of the social network) and/or the review(s) in order to help to determine whether or not to interact with that business. However, such conventional systems suffer from the deficiency that that information provided about those businesses (e.g., the reviews and ratings) is "stale" or old, i.e., such information was typically provided days, weeks, months, or even years prior to the date that such information is being retrieved. As such, the user retrieving that information may be provided an inaccurate view of the business, particularly with regard to the date on which the user is retrieving that information and likely considering interacting with the business.

Thus, there is a need for an improved social networking system.

Figure 1:
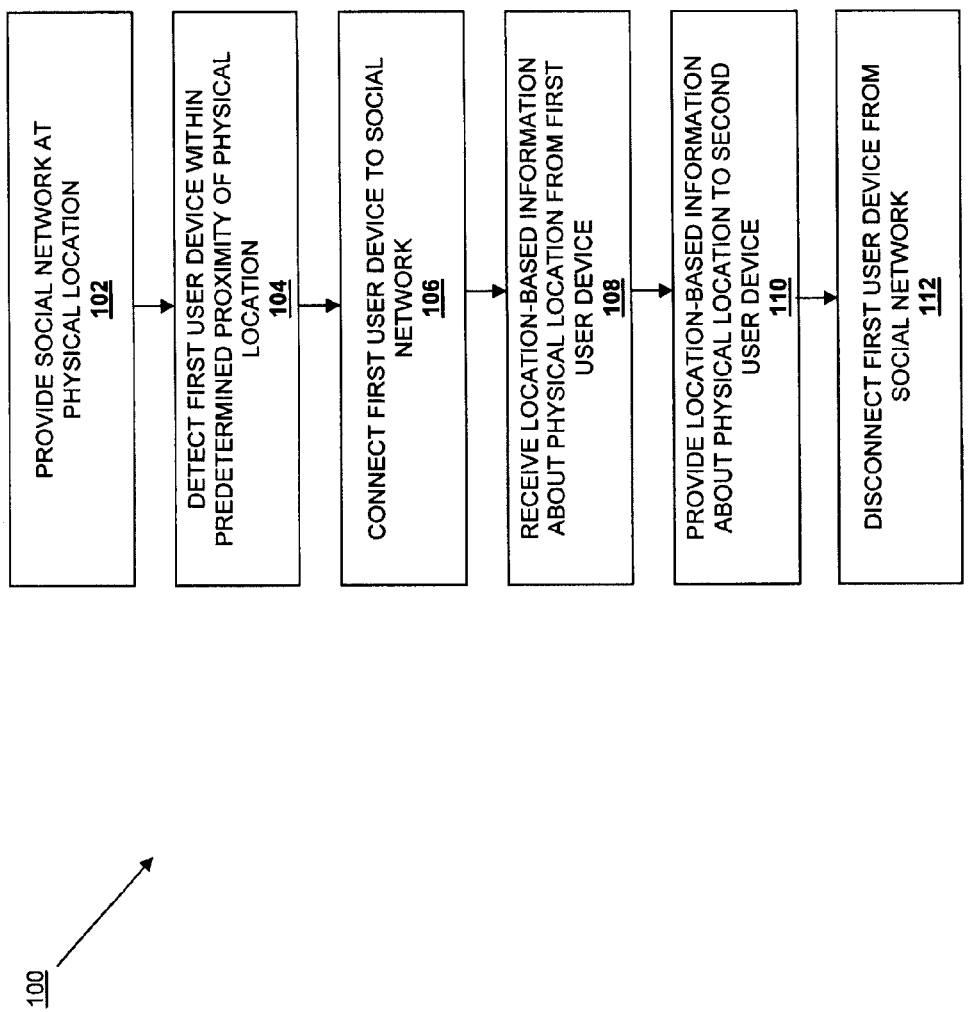
FIG. 1 is a flow chart illustrating an embodiment of a method for providing location-based information using a social network.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing information associated with a physical location through the use of temporary social networks that "broadcast" information from user devices that have been connected to the social network in response to being within a predetermined proximity of the physical location. The social networks may be temporary in that user devices may be removed from the social network upon leaving the predetermined proximity and/or after a predetermined amount of time has passed. Such temporary social networks allow for the leveraging of users located at a physical location to provide real-time, crowd-sourced recommendations and information about the business and/or physical location. Information associated with the physical location may be provided to other user devices based on a variety of criteria including, but not limited to, the other user devices entering the physical location, the other user devices being associated with details related to the information and/or the physical location (e.g., through user profiles), requests from the other user devices, the other users being linked to the users that provided the information, etc.

In the systems and methods discussed below, a system provider device provides the temporary social network system to communicate with a plurality of user devices in order to receive location-based information from user devices that have entered a physical location and then provide that location-based information to other user devices. In some embodiments, that system provider device may provide, or be coupled to a payment service provider device that provides, a payment service system that allows the user to make payments to businesses using the user device. For example, a payment service provider such as, for example, PayPal Inc. of San Jose, Calif., may provide a payment service provider system that allows a user to associate one or more payment accounts provided by account providers with a payment service account, and then use that payment service account (e.g., via the user device) to pay for purchases from businesses by transferring funds from the payment account to an account of the business. As such, the system provider device may be coupled to a database of purchases (e.g., a purchase history) made by a user of a user device.

Figure 2:
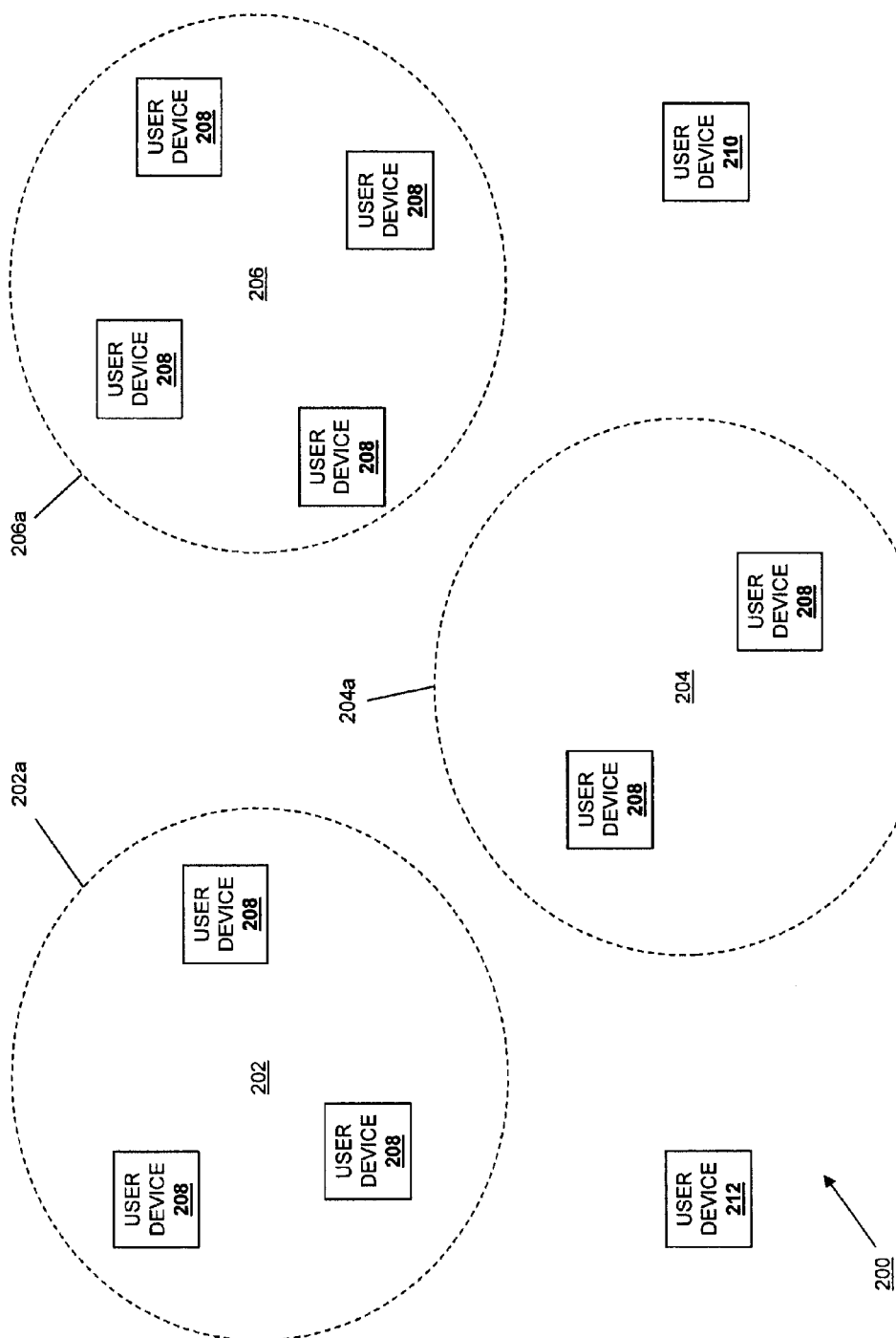
FIG. 2 is a schematic view illustrating an embodiment of a plurality of physical locations associated with respective social networks.

Referring now to FIGS. 1 and 2, a method 100 for providing information using temporary social networks is illustrated. The method 100 begins at block 102 where a social network is provided at a physical location. FIG. 2 illustrates an embodiment of a physical area 200 that includes a plurality of physical locations 202, 204, and 206. As discussed in further details below, a physical location may be defined and/or occupied by a business, merchant, or other establishment that caters to users using the user devices discussed below. For example, physical locations may include businesses such as grocery stores, restaurants, bars, movie theaters, music venues, and/or a variety of other businesses known in the art. Each of the physical locations 202, 204, and 206 may provide or otherwise be associated with a social network that, in the illustrated embodiment, is bounded by a perimeter 202a, 204a, and 206a, respectively, that may also define a predetermined proximity of the physical location 202, 204, and 206, respectively, within which a user device must enter in order to join the social network.

In an embodiment, a physical location may include a system provider device that provides a social network using short range network provisioning technologies such as, for example, Near Field Communication (NFC) technology, Bluetooth® technology, WiFi technology, and/or a variety of other short range communications technologies known in the art. For example, the system provider device at the physical location 202 may use a short range network provisioning technology that provides for communication within the perimeter 202a such that a user device within that perimeter 202a can communicate with the system provider device to join the social network. In another embodiment, a system provider device may define a perimeter for a physical location using coordinates (e.g., Global Positioning System (GPS) coordinates) and then monitor the location of user devices to determine when a user device enters that perimeter and may join the social network. For example, a system provider device (which may or may not be at the physical location 202) may retrieve location information from user devices (e.g., from a location determination device in a user device) and, when the location of a user device coincides with a location within the perimeter 202a, ask or allow that user device to join the social network. Such embodiments may be enabled by the user devices communicating with the system provider device upon determining that they have entered the perimeter for a given physical location (e.g., using a location determination device in the user device.) While a few examples of the provision of a social network at a physical location have been described, one of skill in the art will recognize that a social network may be provided at a physical location in a variety of other manners while remaining within the scope of the present disclosure.

In the embodiment illustrated in FIG. 2, the physical area 200 may be a variety of physical areas known in the art that include businesses in the different physical locations 202, 204, and 206. For example, the physical area 200 may be a mall with a plurality of different stores in each of the physical locations 202, 204, and 206 such as, for example, a shoe store, a clothing store, and a coffee shop. In another example, the physical area 200 may be a business district with a plurality of businesses in each of the physical locations 202, 204, and 206 such as a bar, a dance club, and a restaurant. In another example, the physical area 200 may be a business such as a grocery store with a plurality of business areas in each of the physical locations 202, 204, and 206 such as a vegetable section, a meat section, and a bakery section. While a few examples of the physical area 200 and physical locations 202, 204, 206 have been provided, a wide variety of modification to the illustrated embodiment is envisioned as falling within the scope of the present disclosure, including any number of physical locations (and as few as one physical location providing an associated social network).

In the embodiment of FIG. 2, a plurality of user devices are illustrated in the physical area 200, including user devices 208 within the perimeters 202a, 204a, and 206a of the physical locations 202, 204, and 206, respectively, along with user devices 210 and 212 outside of the perimeters 202a, 204a, and 206a of the physical locations 202, 204, and 206, respectively. As discussed in further detail below, users may bring their user devices within a predetermined proximity of the physical locations 202, 204, and/or 206 (e.g., the user devices 208) in order to join the respective social network associated with that physical location. In some embodiments, those user devices may be disconnected from a social network upon moving outside of the predetermined proximity of its associated physical location, while in other embodiments, those user devices may remain connected to a social network upon moving outside of the predetermined proximity of its associated physical locations for a predetermined amount of time. Thus, in some embodiments, the user devices 210 and/or 212 may be connected to social networks provided by one or more of the physical locations 202, 204, and/or 206 while not being within their associated perimeters 202a, 204a, and/or 206a, respectively.

Figure 3:
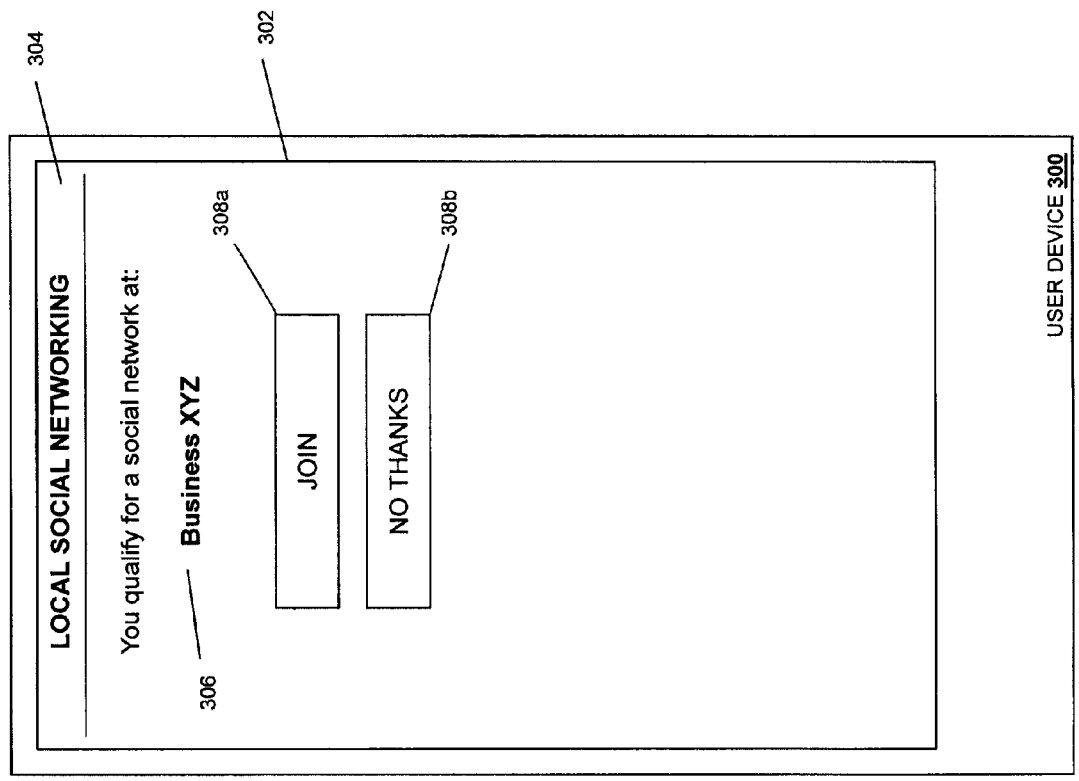
FIG. 3 is a front view illustrating an embodiment of a user device displaying a social network detection screen.

Referring now to FIGS. 1, 2, and 3, the method 100 then proceeds to block 104 where a first user device is detected within a predetermined proximity of a physical location. As discussed above with reference to FIG. 2, in one embodiment, users in the physical area 200 may carry their user devices within a predetermined proximity of physical locations 202, 204, or 206 by moving within the perimeters 202a, 204a, or 206a, respectively. Using the physical location 202 and associated perimeter 202a as an example, a user may move within the perimeter 202a with a user device 208 such that the user device 208 is within range/the predetermined proximity and may communicate with a system provider device at the physical location 202 using a short range communication technology. In another example, a user may cross the perimeter 202a with a user device 208 that periodically sends its location to a system provider device, which may be at the physical location 202 or separate from the physical location 202, and the user device 208 will send a location that corresponds to a location within the perimeter 202a/the predetermined proximity of the physical location 202.

FIG. 3 illustrates an embodiment of a user device 300, which may be any of the user devices 208 discussed above with reference to FIG. 2, detected within a predetermined proximity of a physical location (e.g., one of the physical locations 202, 204, and/or 206.) The user device 300 includes a display device 302 that, in the illustrated embodiment, is displaying a social network detection screen 304. In an embodiment, the system provider device detects that the user device 300 is within the predetermined proximity of the physical location and, in response, communicates with the user device 300 over a network (e.g., over the short range communications network when the system provider device is at the physical location, over the Internet when the system provider device is at the physical location or remote from the physical location, etc.) to cause the user device 300 to display the social network detection screen 304.

The social network detection screen 304 includes a physical location identifier 306 along with a join button 308a and a do not join button 308b. In some embodiments, upon detecting the user device 300 within the predetermined proximity of the physical location, the system provider device may communicate with the user device 300 to provide the social network detection screen 304 as a webpage or other Internet browser provided screen. For example, the entering of the user device 300 within the perimeter 202*a* of the physical location 202 may cause the user device 300 to display the social network detection screen 304 or allow the user to navigate to the social network detection screen 304. In other embodiments, upon entering within the predetermined proximity of the physical location, the user device 300 may provide the social network detection screen 304 through an application running on the user device 300. For example, the entering of the user device 300 within the perimeter 202*a* of the physical location 202, the user may launch the application on the user device 300 such that the social network detection screen 304 is provided or the user may navigate to the social network detection screen 304. While a few examples of the detection of the user device and corresponding provision of the social network detection screen have been described, a variety of other methods for detection of user devices and/or provision of social network detection screens that allow the user to choose whether or not to join the social network at the physical location will fall within the scope of the present disclosure.

The method 100 then proceeds to block 108 where the first user device is connected to the social network. In the illustrated embodiment, in response to the user device 300 displaying the social network detection screen 304 after the user bringing the user device 300 within the perimeter 202*a* of the physical location 202, the user may decide whether or not to join the social network for business XYZ at the physical location 202 by selecting the join button 308*a* or the do not join button 308*b*. If the user selects the do not join button 308*b*, the user device will communicate with the system provider device to instruct the system provider device to not connect the user device to the social network for business XYZ at the physical location 202. If the user selects the join button 308*a*, the user device will communicate with the system provider device to instruct the system provider device to connect the user device to the social network for business XYZ at the physical location 202.

The moving of user devices within a predetermined proximity of a physical location may occur for any number of user devices, and thus a plurality of user devices may be connected to a social network associated with a physical location substantially as described above. Thus, referring to FIG. 2, any or all of the user devices 208 within the perimeter 202*a* may be connected to the social network for the physical location 202, any or all of the user devices 208 within the perimeter 204*a* may be connected to the social network for the physical location 204, and any or all of the user devices 208 within the perimeter 206*a* may be connected to the social network for the physical location 206.

Figure 4:
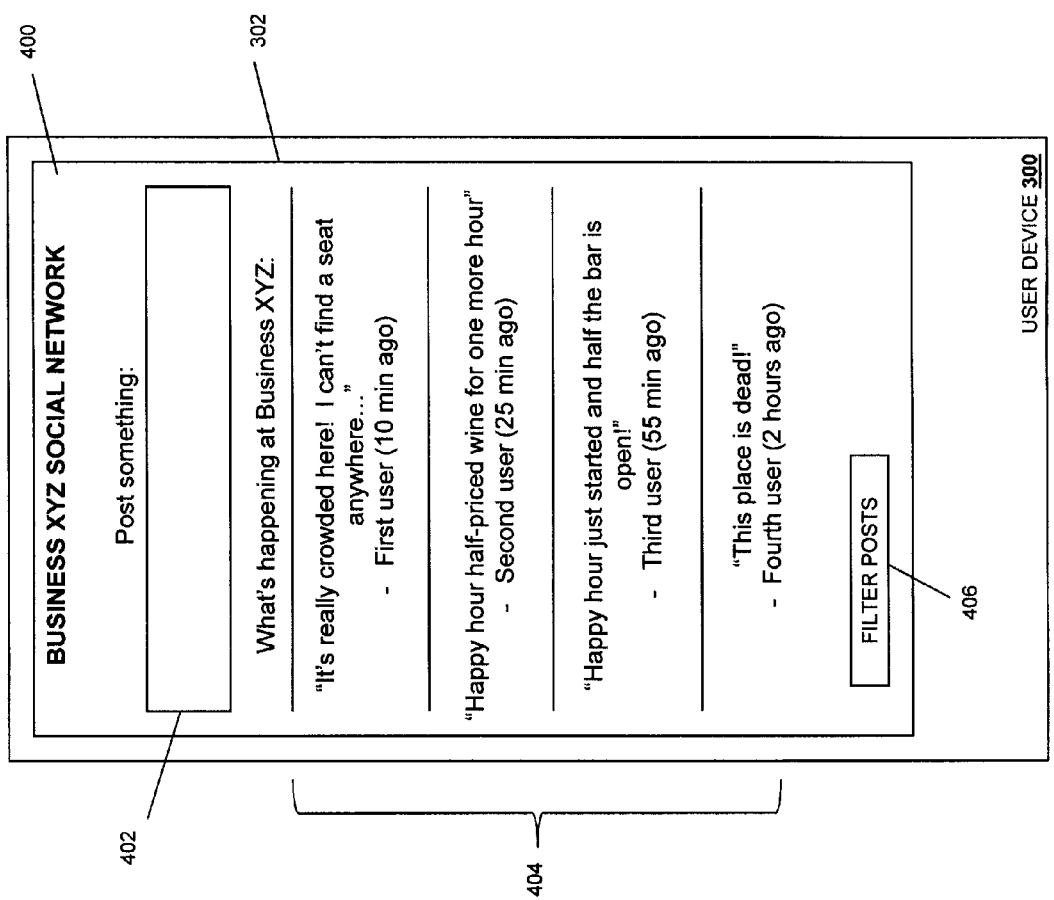
FIG. 4 is a is a front view illustrating an embodiment of a user device displaying a social network information provision and reporting screen.
Figure 5:
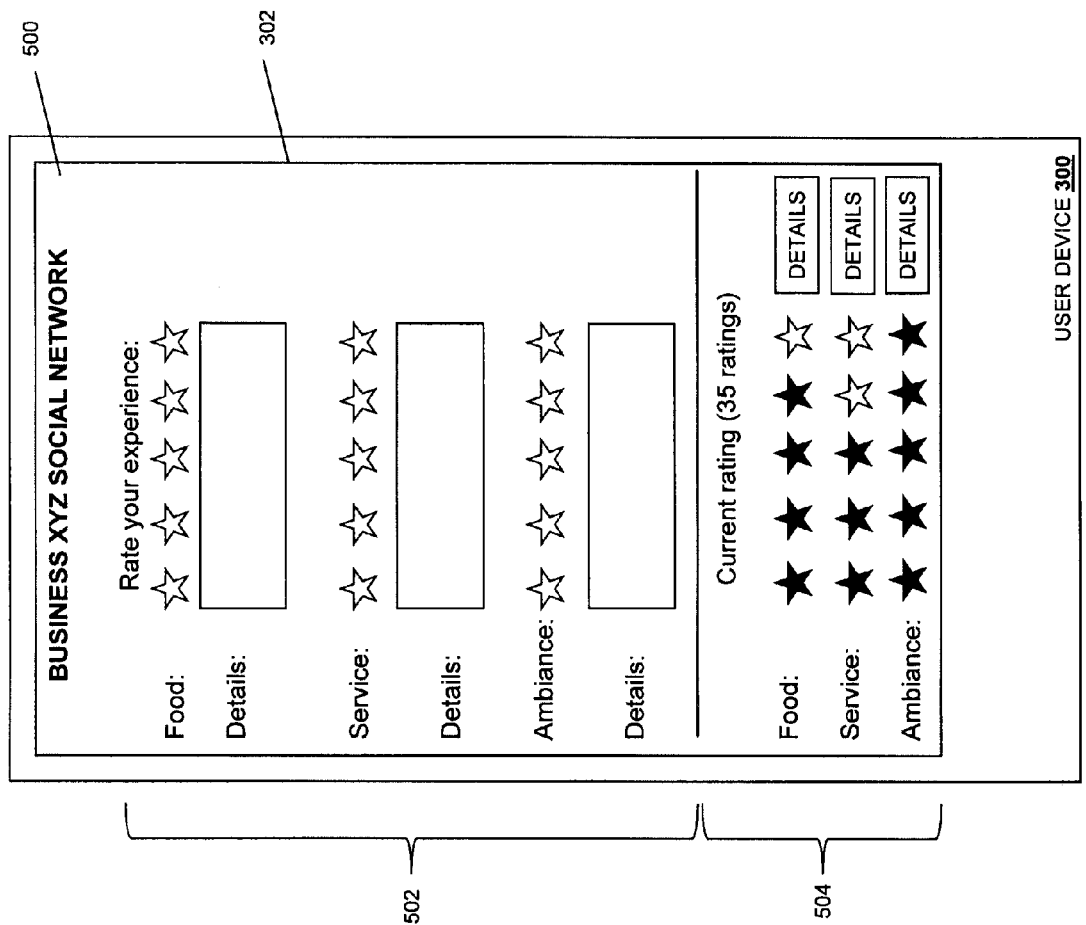
FIG. 5 is a is a front view illustrating an embodiment of a user device displaying a social network information provision and reporting screen.

Referring now to FIGS. 1, 4, and 5, the method 100 then proceeds to block 108 where location-based information about a physical location is received from a first user device. Once user devices are connected to a social network associated with a physical location, those user devices may provide location-based information about the physical location to the system provider device. Location-based information about the physical location may include any information sent from a user device to the system provider device about what is happening at the physical location, about a business at the physical location, about a recent experience at the physical location, and/or a variety of other location-based information known in the art. A few examples of the provision of location-based information are provided below, but the provision of any type of location-based information from the user devices to the system provider device is envisioned as falling within the scope of the present disclosure.

FIG. 4 illustrates the user device 300 displaying a social network information provision and reporting screen 400 that allows the user to provide location-based information about business XYZ at a physical location through a temporary social network. The screen 400 includes a location-based information input 402 in which the user may input location-based information (e.g., text, images, video, etc.). The screen 400 also includes a reporting section 404 that is displaying location-based information received from other user devices connected to the social network associated with that physical location (e.g., for business XYZ). As can been seen, the reporting section 404 includes location-based information, or "posts", provided from other user devices over a plurality of recent times that include specific information associated with the physical location and business XYZ. In the illustrated example, a review of the reporting section 404 allows a user to determine the status of the physical location and business XYZ over the last 2 hours as it changed from a relatively slow business situation to a relatively busy business situation, along with information about deals offered by business XYZ at the physical location. Furthermore, the user of the user device 300, which is now connected to the social network at the physical location, may provide location-based information in the location-based information input 402 to have that location-based information "posted" in the reporting section 404 and visible by other users (discussed in further detail below.) While the reporting section 404 is illustrated as including a plurality of text "posts", as discussed above, user devices connected to the social network at the physical location may also provide videos, audio, images, and other media that will then be provided in the reporting section 404. The screen 400 also includes a filter button 406 that allows the user to filter the location-based information in the reporting section 404, discussed in further detail below.

Referring now to FIG. 5, a social network information provision and reporting screen 500 is illustrated. The screen 500 includes a provisioning section 502 and a reporting section 504. As can be seen, the provisioning section includes a plurality of categories (e.g., "food", "service", and "ambiance") that allow the user of the user device 300 to provide a rating (e.g., 1 to 5 "stars") along with details about that rating (e.g., a text explanation for the rating, images, audio, video, etc.). Thus, the user of the user device 300 connected to the social network associated with the physical location can provide ratings (and details about those ratings) for the business at that physical location. The reporting section 504 includes aggregate ratings provided by a plurality of users who are connected (or have been recently connected) to the social network at that physical location, along with the ability to review the details that were provided with each individual rating that makes up the aggregate rating. In the illustrated example, a review of the reporting section 504 allows a user to determine a current situation (as indicated by the aggregate ratings and details) of the business at the physical location. Furthermore, the user of the user device 300, which is now connected to the social network at the physical location, may provide location-based information in the form of the ratings and details in the provisioning section 504 to have that location-based information included in the aggregate ratings and details in the reporting section 404 and visible by other users (discussed in further detail below.)

While a few examples have been provided above, the present disclosure envisions any location-based information as falling within its scope, including the text information "posts" illustrated in FIG. 4, the rating information illustrated in FIG. 5, images captured by cameras on the user devices, video captured by cameras on the user devices, audio captured by a microphone on the user device, statistics about the user devices connected to the social network a physical location (e.g., the number of user devices connected to the social network, details about the users of the user devices retrieved from their user profiles, etc.), and/or a variety of other information known in the art.

Referring now to FIGS. 1, 2, 6, 7, 8, and 9, the method 100 then proceeds to block 110 where location-based information about the physical location is provided to a second user device. While the embodiment illustrated in FIG. 2 includes user devices 210 and 212 just outsides the perimeters 202a, 204a, and 206a of their respective physical locations 202, 204, and 206, as discussed below, a second user device that is not in the social network associated with the physical location and that is being provided the location-based information about the physical location may be physically remote from that physical location and receiving the location-based information over a network such as the Internet. Furthermore, as discussed above, second user devices that are part of a social network may be provided the location-based information associated with that social network as well (e.g., through the reporting sections 404 and 504 of the screens 400 and 500, respectively, illustrated above.)

In one example, a user of a second user device may be at first physical location (e.g., their home), far away (e.g., miles) from a second physical location that includes a business, and may search and find the social network associated with the second physical location in order to receive the location-based information generated by the user devices connected to that social network in order to determine what is happening at that physical location and its associated business. In another example, the user of a second user device (e.g., the user devices 210 or 212) may be outside the perimeters 202a, 204a, and 206a of the physical locations 202, 204, and 206, and may either request or be automatically provided the location-based information generated by the user devices connected to the social network associated with the physical location. In yet another embodiment, the user of a second user device may include a user profile (e.g., a social network profile) that is connected or linked to the user profile of a user that provided location-based information associated with a physical location (e.g., the user of the second user device may be "following" the user that provided the location-based information), and due to that linking or connection, the user of the second user device may be provided the location based information discussed herein. In the FIGS. 6-9 discussed below, a few examples of the display of such location-based information are provided, but any manner of receiving any type of location-based information is envisioned as falling within the scope of the present disclosure.

Figure 6:
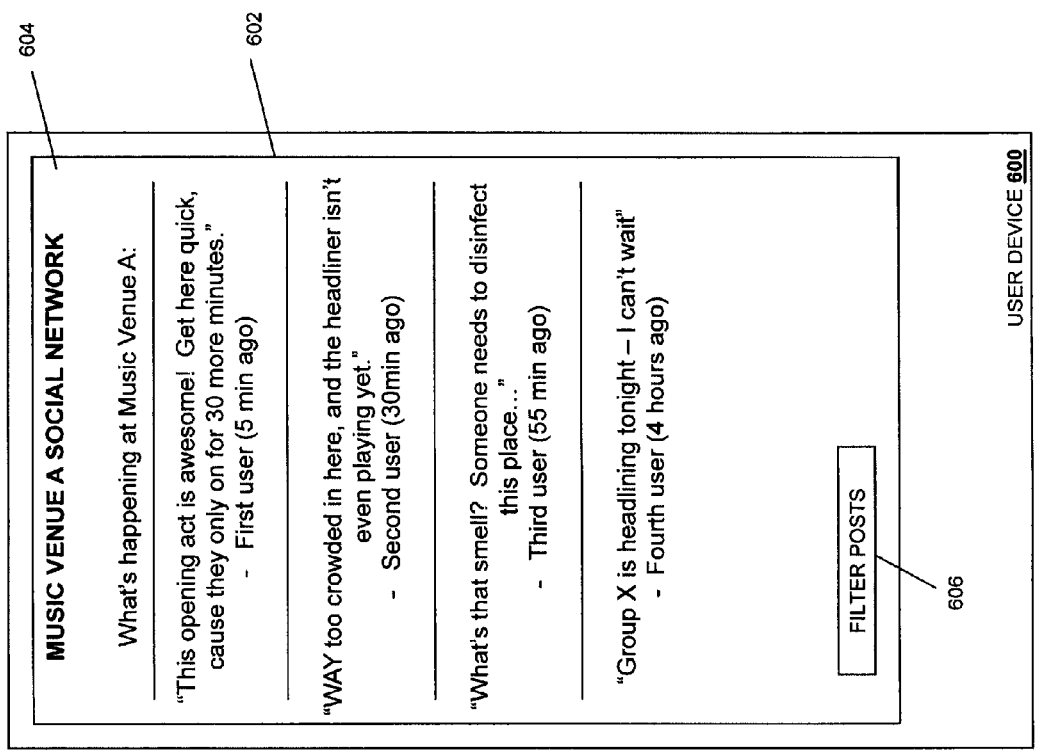
FIG. 6 is a is a front view illustrating an embodiment of a user device displaying a social network information reporting screen.

FIG. 6 illustrates an embodiment of a user device 600, which may be any of the user devices 208, 210, and 212 discussed above with reference to FIG. 2, receiving the location-based information about the physical location at block 110 of the method 100. The user device 600 includes a display device 602 that, in the illustrated embodiment, is displaying a social network information reporting screen 604. In an embodiment, second user device 600 requests location-based information about the physical location (e.g., through a search page, using an application on the second user device, etc.) from the system provider device, and the system provider device then communicates with the second user device to provide the screen 604 on the second user device 600. The screen 604 includes a plurality of location-based information, or "posts", from the first user devices that are connected to the social network associated with the physical location. As can be seen in the illustrated embodiment, the location-based information displayed on the screen 604 provides the user of the second user device 600 with information provided by other users who have been present at that physical location over the previous four hours. The screen 604 also includes a filter button 606 that the user may use to filter the location-based information about the physical location, discussed in detail below.

In some embodiments, the location-based information provided to the second user device 600 (e.g., as illustrated on the screen 604 or other screens discussed below) may be provided to the second user device 600 based upon information on the second user device 600 or information associated with the user and/or the second user device 600. In an embodiment, the second user device 600 may include or be associated with a calendar that includes information detailing future plans of the user. For example, the user of the second user device 600 may include information associated with a calendar that details plans to attend the music venue A illustrated on the screen 604, and the second user device 600 and/or system provider device may use that information to provide the screen 604 (reporting the location-based information for music venue A) to the second user device 600. As such, calendar information, email information, text information, browsing histories, weather information, and/or a variety over other information that may be included on a user device may be mined or otherwise used to determine user-relevant location-based information reporting screens to provide to the user via the second user device 600.

Figure 7:
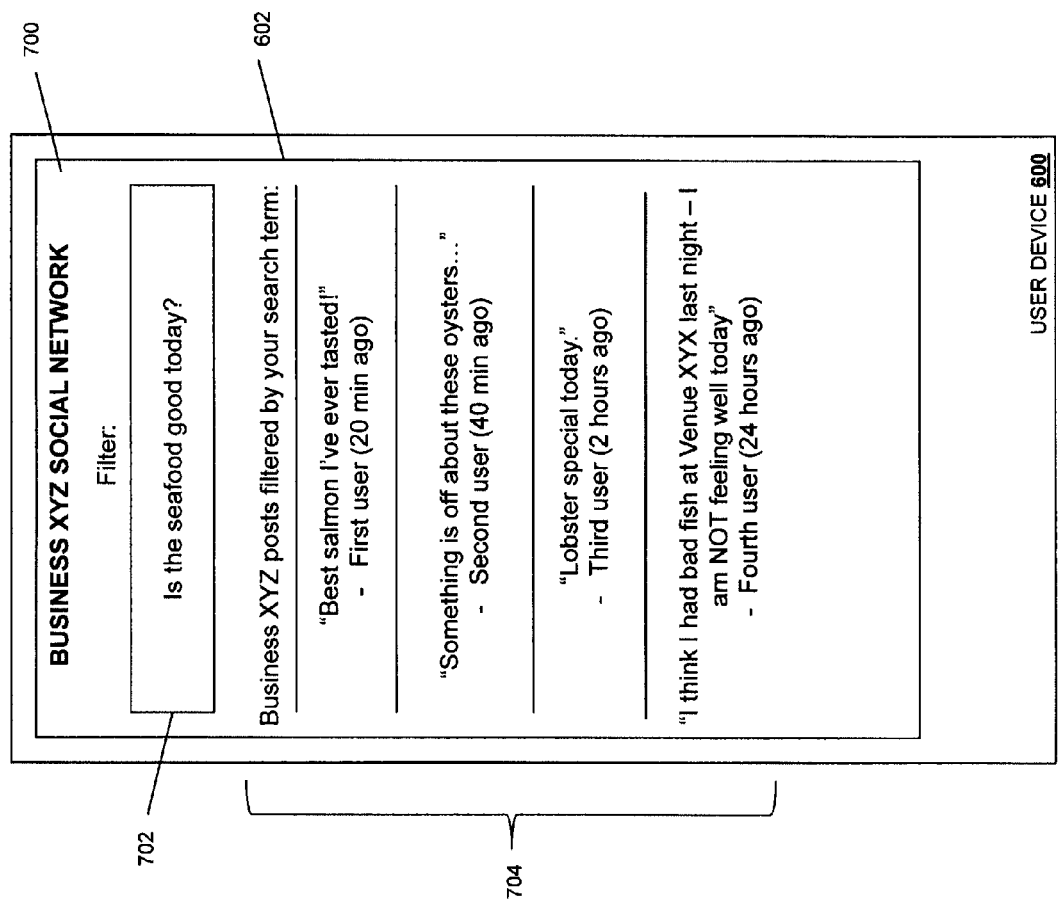
FIG. 7 is a is a front view illustrating an embodiment of a user device displaying a social network information filtering screen.

FIG. 7 illustrates the user device 600 displaying an embodiment of a filtered information screen 700. In an embodiment, the user, having received a social network information reporting screen similar to the screen 604 of FIG. 6, has selected to filter the displayed information (e.g., using a filter button similar to the filter button 600 of FIG. 6). In the illustrated example, the user of the second user device 600 has retrieved location-based information about a business XYZ that provides seafood, selected a filter button to be provided a filter input 702, and then filtered the location-based information by providing the query "Is the seafood good today?" in the filter input 702. As can be seen, in response the filtered information screen 700 includes a reporting section 704 displaying location-based information related to seafood provided by the business at the physical location that was received from users who are (or were) at the business/physical location and provided that location-based information, substantially as discussed above with reference to FIGS. 4 and 5.

Figure 8:
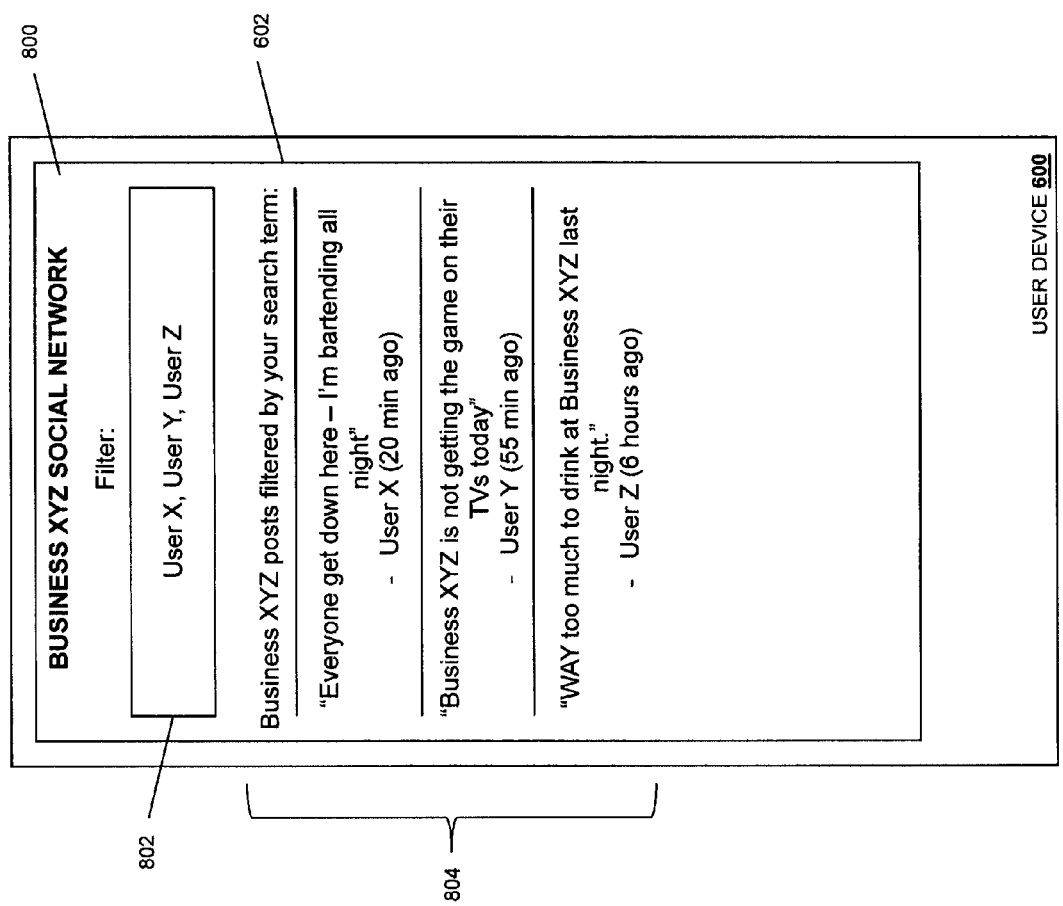
FIG. 8 is a is a front view illustrating an embodiment of a user device displaying a social network information filtering screen.

FIG. 8 illustrates the user device 600 displaying an embodiment of a filtered information screen 800. In an embodiment, the user, having received a social network information reporting screen similar to the screen 604 of FIG. 6, has selected to filter the displayed information (e.g., using a filter button similar to the filter button 600 of FIG. 6). In the illustrated example, the user of the second user device 600 has retrieved location-based information about a business XYZ that provides alcohol, selected a filter button to be provided a filter input 802, and then filtered the results by providing the query "User X, User Y, and User Z" in the filter input 802 to filter the location-based information by the users that provided it. As can be seen, in response the filtered information screen 800 includes a reporting section 804 displaying location-based information about the physical location that was received from users X, Y, and Z.

While a few examples of the filtering of location-based information have been discussed above, those examples are not meant to be limiting. Filtering of images, audio, video, and/or location-based information (other than the text in the illustrated embodiments) are envisioned as falling within the scope of the present disclosure.

Figure 9:
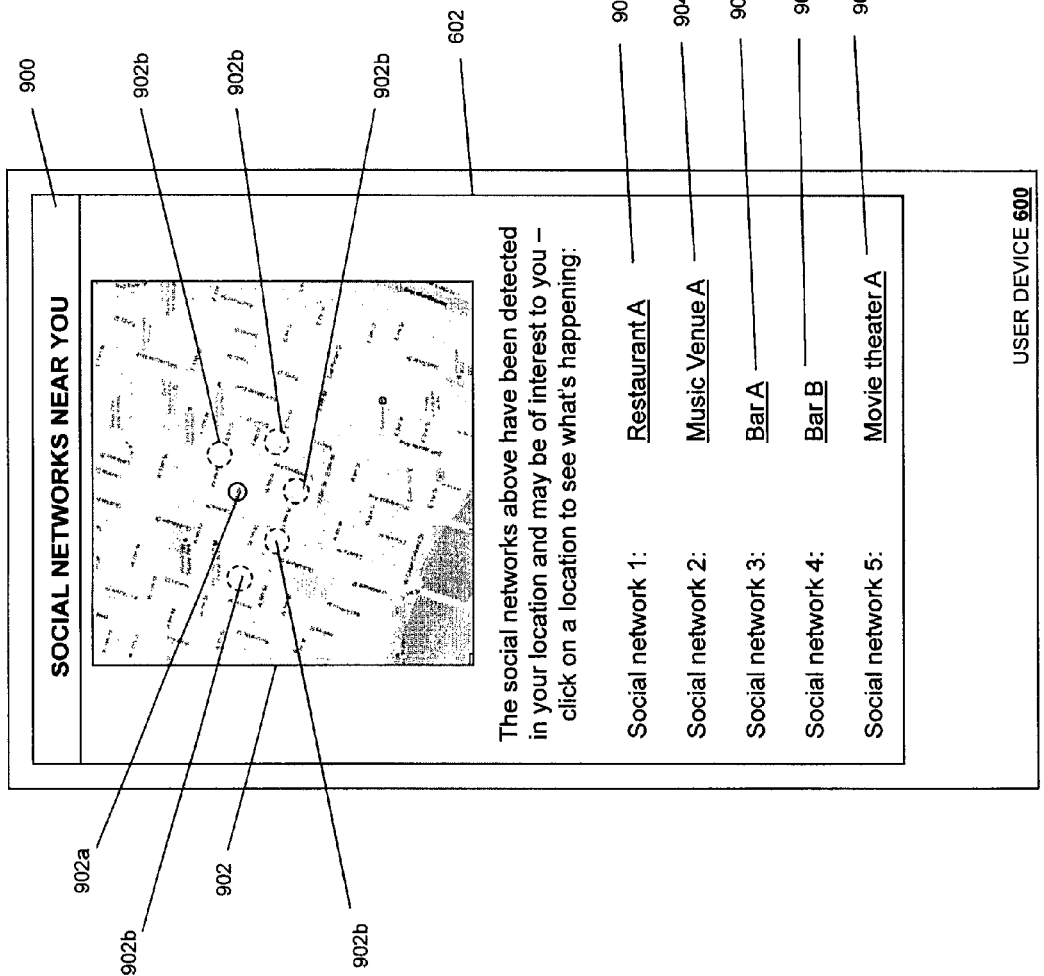
FIG. 9 is a is a front view illustrating an embodiment of a user device displaying a social network detection screen.

FIG. 9 illustrates the user device 600 displaying an embodiment of a social network information reporting screen 900. In an embodiment, the user is in a physical area (e.g., similar to the physical area 200 discussed above with reference to FIG. 2), and may have requested (e.g., from one or more system provider devices) or been automatically provided details about location-based social networks near the user device 900. For example, the user device 600 may include an application that is operable to retrieve social network information from one or more system provider devices, or that user device 600 may be used to access a website or server that aggregates information from one or more system provider devices. The social network information reporting screen 900 includes a physical area map 902 that displays a user location indicator 902a that indicates the current location of the user device 900 on the map 902, along with a plurality of social network indicators 902b that indicate the relative position of social networks on the map 902 that are near the user device 900. The social network information reporting screen 900 also includes a plurality of social network links 904 for each of the social network indicators 902b displayed on the physical area map 902. In an embodiment, any of the social network links 904 may be selected by the user to provide a location-based information reporting screen for that social network that is similar to the location-based information reporting screens discussed above.

In an embodiment, the social network indicators 902b and social network links 904 may be determined and provided to the user device 600 based on a user profile as well as, or instead of, the location of the user device 600. For example, the user device 600 may be associated with a user profile (e.g., through a social network account of the user of the user device 600) that includes information or details about the user such as, for example, favorite foods, music, books, movies, and/or that provide a variety of other details about the user. At block 110, the user device 600 and the system provider device may communicate those details from the user profile such that the user device and/or system provider device may determine the social networks that are most relevant to the user of the user device 600. For example, the social network links 904 may include a link for restaurant A that serves food listed as a favorite food in the user profile, a link for music venue A which is scheduled to play music from a band listed as a favorite band in the user profile or that plays a favorite music listed in the user profile, and a link for movie theater A that is scheduled to play a movie that is similar to a movie listed as a favorite movie in the user profile. Furthermore, as discussed above, the social network indicators 902a and social network links 904 may be for social networks selected using information on the user device 600 as discussed above (e.g., email information, text information, calendar information, etc.)

The method 100 then proceeds to block 112 where a first user device is disconnected from the social network. As discussed above in some embodiments, the social network provided at a physical location may be temporary with respect to the user devices connected to it. When and how a user device is disconnected from the social network at a physical location may be based on location of the user device, a time the user device has been connected to the social network, and/or a variety of other factors. For example, a user device 208, illustrated in FIG. 2, may be disconnected from a social network associated with a physical location 202, 204, or 206, in response to being moved outside of the perimeter 202a, 204a, or 206a, respectively, of that physical location 202, 204, or 206. In another embodiment, a user device that is connected to a social network associated with a physical location 202, 204, or 206 may remain connected to that social network after being moved outside of its associated perimeter 202a, 204a, or 206a, respectively, for a predetermined amount of time. For example, the user device 210 or 212 illustrated in FIG. 2 may have connected to a social network associated with one of the physical locations 202, 204, or 206 and then moved outside of its perimeter 202a, 204a, or 206a, and those user devices 210 or 212 may remain connected to the social network and have the ability to provide location-based information about that physical location for a predetermined amount of time (e.g., see the reporting section 704 illustrated in FIG. 7 displaying location-based information received from a fourth user that provided that location-based information about business XYZ the day following that user and their user device being located at the physical location of business XYZ.)

In some embodiments, temporary social networks associated with a physical location may include any user device located within a predetermined proximity of the physical location within a predetermined time. For example, a user with a user device may move within the perimeter of a physical location, and that user may then be connected to a social network that is associated with that physical location and includes any user device that has been within the perimeter of a physical location (and accepted a connection to the social network) within the last 2 hours. In some embodiments, groups of user devices within a social network may be grouped by purchase histories (i.e., the system provider device may review purchase histories of users associated with the user devices in the social network and group user devices together if they have similar purchase histories), current purchases (i.e., the system provider device may monitor purchases made using the user devices in the social network and group user devices together if they are currently making similar purchases), products viewed (i.e., the system provider device may monitor the specific locations of the user devices that are within the perimeter of the physical location and group user devices together if they spent a predetermined amount of time in a particular area and thus can be assumed to have been viewing particular products in the physical location), and/or using a variety of other grouping criteria known in the art.

Furthermore, the amount of time a social network may be active for a particular user may be determined by the amount of time the user typically spends at the physical location. For example, if a user typically spends thirty minutes when shopping at a business at the physical location, upon entering the perimeter of the physical location the user device of that user may be connected to a social network that includes other user devices that have been at that physical location in the last thirty minutes. In some examples, a minimum amount of time may be necessary to provide an adequately sized social network (i.e., a user may spend an average of 5 minutes any time they visit a particular location, but the social network for that user upon entering that physical location may include any user devices in that physical location in the past 15 minutes.)

Thus, a system and method for information provision using temporary social networks has been described that creates social networks at physical locations in order to allow users at those physical locations (or users that have recently been at that physical location) to provide location-based information about those physical locations. That location-based information may then be provided to other users to allow those other users to determine the current status of the physical location. Thus, users at the physical location may provide real-time recommendations about the physical location to other users, and those other users may use the real-time location-based information to determine whether it would be worthwhile to them to go to the physical location, what would be most worthwhile to them to do at the physical location, etc. In some embodiments, users must be physically located at the physical location to join its associated social network and provide location-based information, ensuring to other users that the location based information about the physical location is timely and provided by users that are actually present at the physical location.

Figure 10:
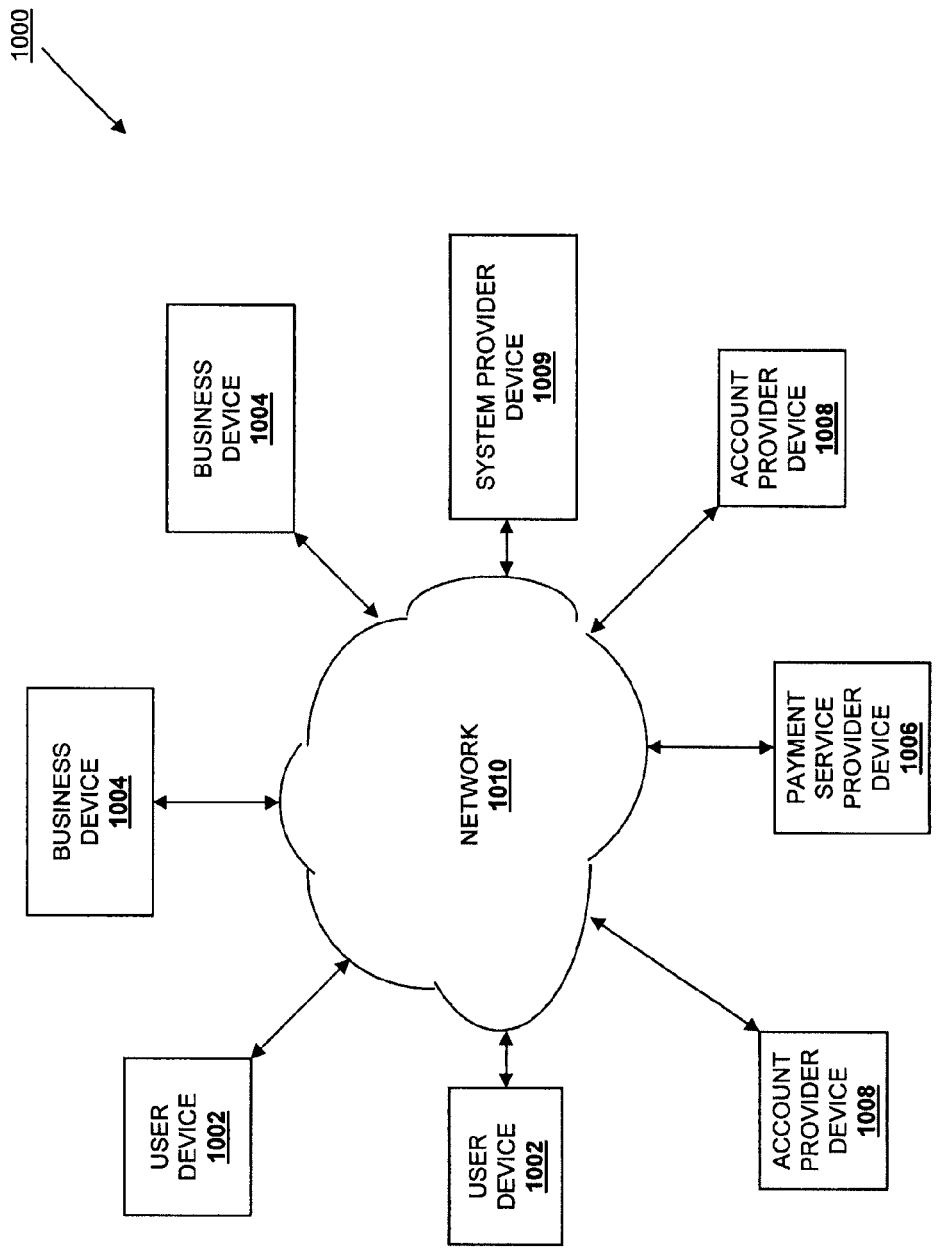
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes a plurality of user devices 1002, a plurality of business devices 1004, a payment service provider device 1006, a plurality of account holder devices 1008, and/or a system provider device 1009 in communication over a network 1010. Any of the user devices 1002 may be the user devices 300 and/or 600, discussed above. The business devices 1004 may be the devices operated by the businesses at the physical locations discussed above. The payment service provider device 1006 may be the payment service provider devices discussed above and may be operated by a payment service provider such as, for example, PayPal Inc. of San Jose, Calif. The account provider devices 1008 may be the account provider devices discussed above and may be operated by the account providers discussed above such as, for example, credit card account providers, bank account providers, savings account providers, and a variety of other account providers known in the art. The system provider device 1009 may, as discussed above, be located at a physical location or remote from a physical location and operated by a third party (with respect to the user, business, system provider, and/or account provider) to provide the social networks discussed above.

The user devices 1002, business devices 1004, payment service provider device 1006, account provider devices 1008, and/or system provider device 1009 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In other embodiments, the user device 1002 may be a smart phone, personal digital assistant (PDA), laptop computer, and/or other types of computing devices.

The user device 1002 may include one or more browser applications which may be used, for example, to provide a convenient interface to permit the user to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the user. In one embodiment, the toolbar application may display a user interface in connection with the browser application.

The user device 1002 may further include other applications as may be desired in particular embodiments to provide desired features to the user device 1002. In particular, the other applications may include a payment application for payments assisted by a payment service provider through the payment service provider device 1006. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the payment service provider device 1006, account provider device 1008, and/or the system provider device 1009 to associate the user with a particular account as further described herein.

The business device 1004 may be maintained, for example, by a conventional or online merchant, conventional or digital goods seller, individual seller, and/or application developer offering various products and/or services in exchange for payment to be received conventionally or over the network 1010. In this regard, the business device 1004 may include a database identifying available products and/or services (e.g., collectively referred to as items) which may be made available for viewing and purchase by the user.

The business device 1004 also includes a checkout application which may be configured to facilitate the purchase by the payer of items. The checkout application may be configured to accept payment information from the user through the user device 1002, the account provider through the account provider device 1008, and/or from the payment service provider through the payment service provider device 1006 over the network 1010.

Figure 11:
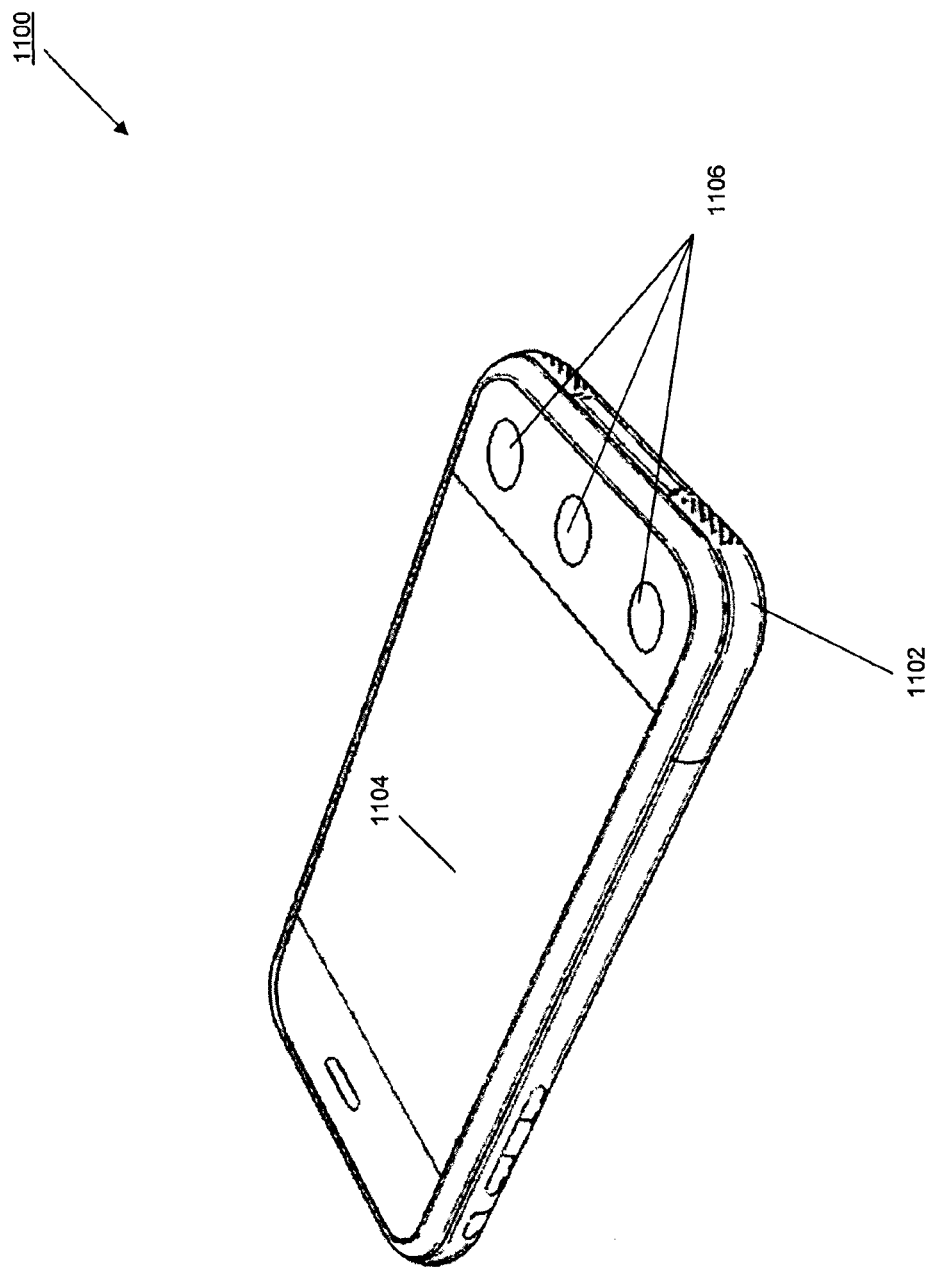
FIG. 11 is a perspective view illustrating an embodiment of a user device.

Referring now to FIG. 11, an embodiment of a user device 1100 is illustrated. The user device 1100 may be the user devices 300, 600, and/or 1102. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 12:
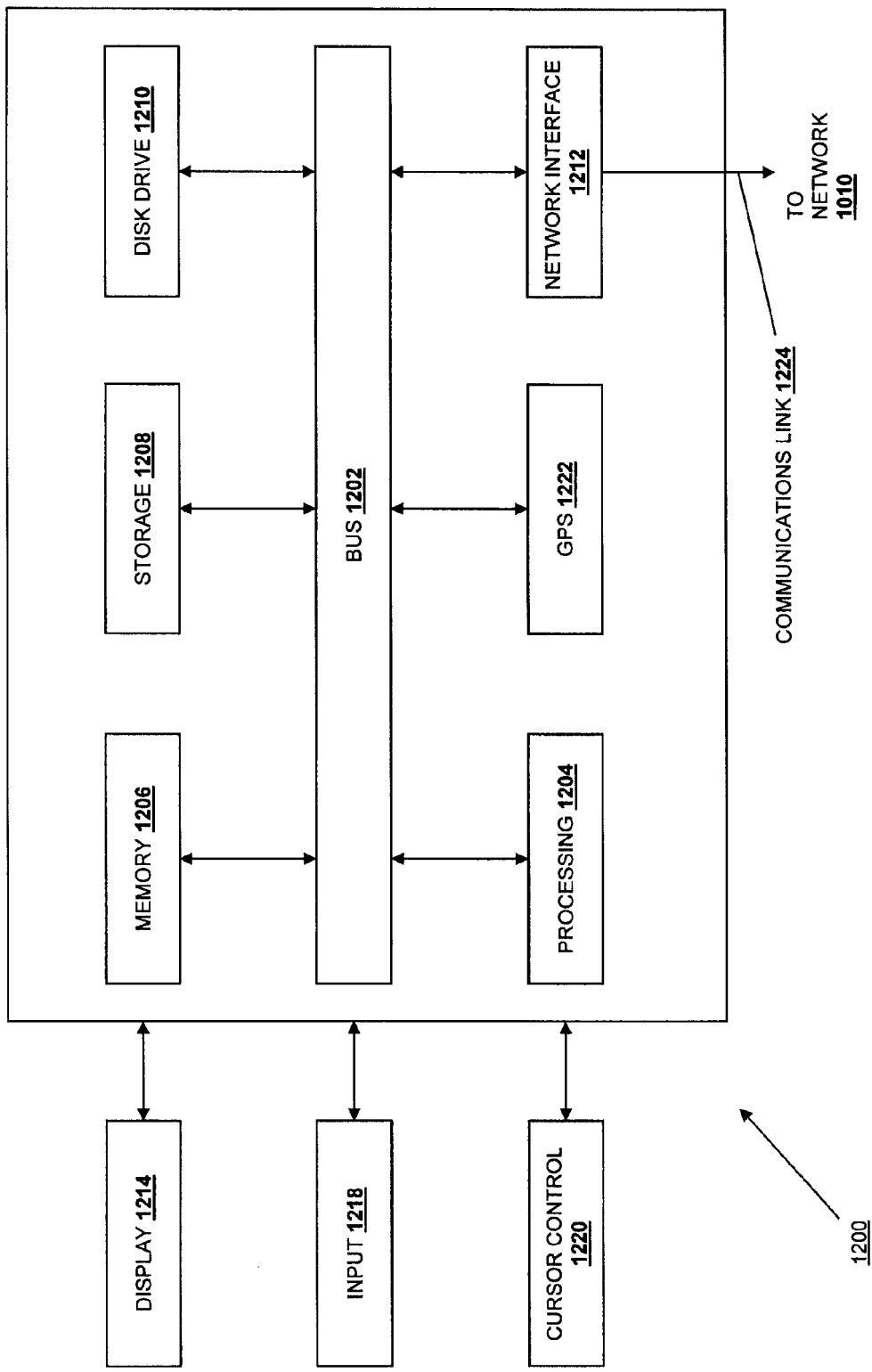
FIG. 12 is a schematic view illustrating an embodiment of a computer system.

Referring now to FIG. 12, an embodiment of a computer system 1200 suitable for implementing, for example, the user device 300, the user device 600, the user device 1002, the user device 1100, the business device 1004, the payment service provider device 1006, the account provider device 1008, and/or the system provider device 1009, is illustrated. It should be appreciated that other devices utilized by users, businesses, payment service providers, account providers, and/or system providers in the payment system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and/or a location determination component 1222 (e.g., a Global Positioning System (GPS) device as illustrated, a cell tower triangulation device, and/or a variety of other location determination devices known in the art.) In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the user device 300, 600, 1002, and 1100, the business device(s) 1004, the payment service provider device 1006, the account provider device(s) 1008, and/or the system provider device 1009. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
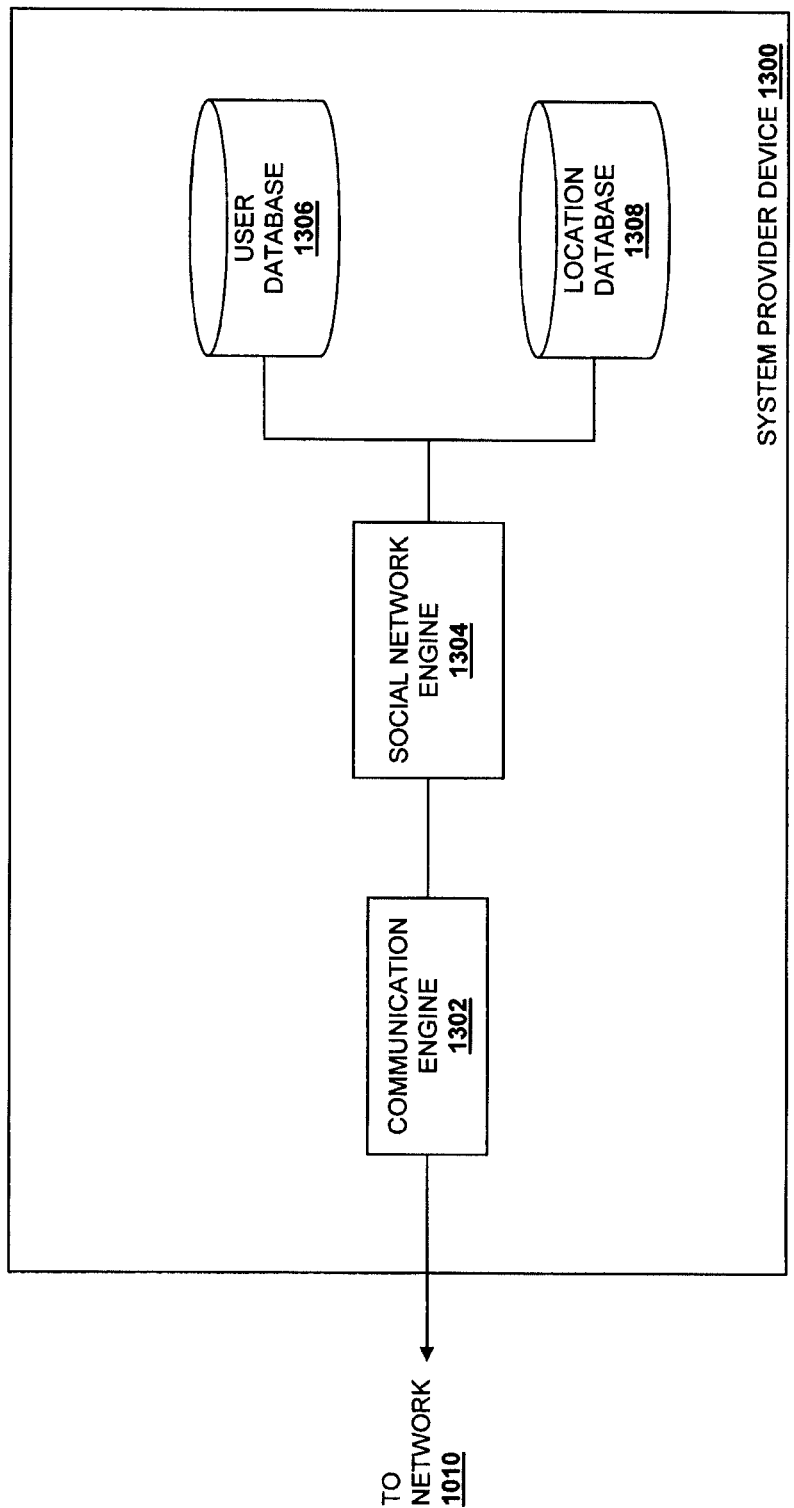
FIG. 13 is a schematic view illustrating an embodiment of a system provider device.

Referring now to FIG. 13, an embodiment of a system provider device 1300 is illustrated. In an embodiment, the device 1300 may be a business device 1004, the payment service provider device 1006, the account holder device 1008, and/or the system provider device 1009. The device 1300 includes a communication engine 1302 that is coupled to the network 1010 and to a social network engine 1304 that is coupled to each of a user database 1306 that includes data about users and a location database 1308 that includes data about physical locations and their associated social networks. The communication engine 1302 may be software or instructions stored on a computer-readable medium that allows the device 1300 to send and receive information over the network 1010. The social network engine 1304 may be software or instructions stored on a computer-readable medium that is operable to detect user devices, connect user devices to one or more social networks associated with physical locations in the physical location database 1308, receive location-based information from user devices, provider location-based information to other user devices, disconnect user devices from social networks, and provide any of the other functionality that is discussed above. While the databases 1306 and 1308 have been illustrated as located in the device 1300, one of skill in the art will recognize that it may be connected to the social network engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users and businesses; however, a user or consumer can pay, or otherwise interact with any type of recipient, including charities and individuals. The interactions do not have to involve a purchase, but may be a loan, a charitable contribution, a gift, etc. Thus, business as used herein can also include charities, individuals, and any other entity or person interacting with a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a database storing information for a plurality of location-based social networks, wherein each location-based social network in the plurality of location-based social networks is associated with a respective physical location;
   a non-transitory memory; and
   one or more hardware processors coupled to the non-transitory memory and configured to read instructions from the non-transitory memory to cause the system to perform operations comprising:
   connecting each of a plurality of first user devices to a first location-based social network in the plurality of location-based social networks using a communications network, wherein the connection of each of a plurality of first user devices to the first location-based social network is allowed at least in part due to each of the plurality of first user devices being located within a predetermined proximity of a first physical location associated with the first location-based social network;
   receiving a plurality of location-based user-generated content submissions about the first physical location associated with the first location-based social network over the communications network from each of the plurality of first user devices connected to the first location-based social network;
   creating a location-based information feed that includes only the plurality of location-based user-generated content submissions that are received from each of the plurality of first user devices connected to the first location-based social network such that the location-based information feed includes only location-based user generated content submissions from first user devices within the predetermined proximity of the first physical location;
   disconnecting a subset of the plurality of first user devices from the first location-based social network at least in art due to each of the subset of the plurality of first user devices being located outside of the predetermined proximity of the first physical location associated with the first location-based social network, wherein the disconnecting prevents each of the subset of the plurality of first user devices from providing further location-based user-generated content submissions in the location-based information feed; and
   providing the location-based information feed over the communications network to a second user device that is located outside the predetermined proximity of the first physical location associated with the first location-based social network.

2. The system of claim 1, wherein the operations further comprise:
   providing the location-based information feed over the communications network to a third user device that is located within the predetermined proximity of the first physical location associated with the first location-based social network.

3. The system of claim 1, wherein the location-based information feed is provided to the second user device over the communications network in response to the second user device being associated with a second user profile that is linked with a first user profile that is associated with one of the plurality of first user devices.

4. The system of claim 1, wherein the location-based information feed is provided to the second user device over the communications network in response to a request by the second user device received through the communications network.

5. The system of claim 1, wherein the operations further comprise:
   retrieving a second user profile that is associated with the second user device; and
   determining that information in the second user profile is related to the at least some of the location-based user-generated content included in the location-based information feed and, in response, providing the location-based information feed over the communications network to the second user device.

6. The system of claim 1, wherein the operations further comprise:
   determining that at least one of the plurality of first user devices has been connected to the first location-based social network for a predetermined amount of time and, in response, disconnecting the at least one of the plurality of first user devices from the first location-based social network.

7. A method, comprising:
   detecting each of a plurality of first user devices within a predetermined proximity of a physical location;
   connecting each of the plurality of first user devices to a location-based social network that is associated with the physical location, wherein the connection of each of the plurality of first user devices to the location-based social network is allowed at least in part due to each of the plurality of first user devices being located within the predetermined proximity of the physical location;
   receiving a plurality of location-based user-generated content submissions over the communications network from each of the plurality of first user devices connected to the location-based social network;
   creating a location-based information feed that includes only the location-based user-generated content submissions that are received from each of the plurality of first user device connected to the location-based social network such that the location-based user information feed includes only location-based user generated content submissions from first user devices that are located within the predetermined proximity of the physical location;

disconnecting a subset of the plurality of the first user devices from the location-based social network at least in part due to each of the subset of the plurality of first user devices being located outside of the predetermined proximity of the physical location associated with the location-based social network, wherein the disconnecting prevents each of the subset of the plurality of first user devices from providing further location-based user-generated content submissions in the location-based information feed; and providing the location-based information feed over the communications network to a second user device that is located outside the predetermined proximity of the physical location associated with the location based social network.

8. The method of claim 7, further comprising
providing the location-based information feed over the communications network to a third user device that is located within the predetermined proximity of the physical location associated with the location-based social network.

9. The method of claim 7, wherein the location-based information feed is provided to the second user device over the communications network in response to the second user device being associated with a second user profile that is linked with a first user profile that is associated with one of the plurality of first user devices.

10. The method of claim 7, wherein the location-based information feed is provided to the second user device over the communications network in response to a request by the second user device received through the communications network.

11. The method of claim 7, further comprising:
retrieving a second user profile that is associated with the second user device; and
determining that information in the second user profile is related to the at least some of the location-based user-generated content included in the location-based information feed and, in response, providing the location-based information feed over the communications network to the second user device.

12. The method of claim 7, further comprising:
determining that at least one of the plurality of first user devices has been connected to the location-based social network for a predetermined amount of time and, in response, disconnecting the at least one of the plurality of first user devices from the location-based social network.

13. The method of claim 7, further comprising:
receiving a filter request from the second user device over the communications network; and
filtering the location-based user-generated content included in the location-based information feed using the filter request to provide a subset of the location-based user-generated content in the location-based information over the communications network to the second user device.

14. A non-transitory machine-readable medium having stored thereon machine-readable instructions executable to cause a machine to perform operations comprising:

detecting a first user device within a predetermined proximity of a physical location that is associated with a location-based social network;

connecting the first user device to the location-based social network, wherein the connecting the first user device to the location-based social network is allowed at least in part due to the first user device being located within the predetermined proximity of the physical location;

receiving a first location-based user-generated content submission over the communications network from the first user device connected to the location-based social network;

creating a location-based information feed and allowing the first location-based user-generated content submission that is received from the first user device to be included in the location-based information feed in response to the first user device being connected to the location-based social network due to the location-based information feed allowing only location-based user generated content from user devices that are located within the predetermined proximity of the physical location;

disconnecting the first user device from the location-based social network at least in part due to the first user device being located outside of the predetermined proximity of the physical location associated with the location-based social network, wherein the disconnecting prevents the first user device from providing further location-based user-generated content submissions in the location-based information feed due to the location-based information feed allowing only location-based user generated content from user devices within the predetermined proximity of the physical location; and providing the location-based information feed over the communications network to a second user device that is located outside the predetermined proximity of the physical location associated with the location based social network.

15. The non-transitory machine-readable medium of claim 14, wherein the operations further comprise:
providing the location-based information feed over the communications network to a third user device that is located within the predetermined proximity of the physical location associated with the location-based social network.

16. The non-transitory machine-readable medium of claim 14, wherein the location-based information feed is provided to the second user device over the communications network in response to the second user device being associated with a second user profile that is linked with a first user profile that is associated with the first user device.

17. The non-transitory machine-readable medium of claim 14, wherein the location-based information feed is provided to the second user device over the communications network in response to a request by the second user device received through the communications network.

18. The non-transitory machine-readable medium of claim 14, wherein the operations further comprise:
retrieving a second user profile associated with the second user device; and
determining that information in the second user profile is related to the location-based user-generated content included in the location-based information feed and, in response, providing the location-based information feed over the communications network to the second user device.

19. The non-transitory machine-readable medium of claim 14, wherein the operations further comprise:

determining that the first user device has been connected to the location-based social network for a predetermined time and, in response, disconnecting the first user device from the location-based social network.

20. The non-transitory machine-readable medium of claim 14, wherein the operations further comprise:

receiving a filter request from the second user device over the communications network; and filtering the location-based user-generated content included in the location-based information feed using the filter request to determine whether to provide the location-based user-generated content in location-based information feed over the communications network to a second user device.

\* \* \* \* \*